(12) United States Patent
Lau et al.

(10) Patent No.: US 6,832,380 B1
(45) Date of Patent: *Dec. 14, 2004

(54) CLIENT-SERVER APPLICATION PARTITIONING WITH METERING TECHNIQUE FOR DISTRIBUTED COMPUTING

(75) Inventors: Edwin J. Lau, San Jose, CA (US); Randall G. Menna, San Jose, CA (US); Prashant Navare, Fremont, CA (US); Tung Nguyen, Fremont, CA (US); James Salois, San Mateo, CA (US)

(73) Assignee: Tarantella, Inc., Santa Cruz, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/672,588

(22) Filed: Jun. 28, 1996

(51) Int. Cl.$^7$ ................................................. G06F 9/00
(52) U.S. Cl. ....................................... 719/328; 709/203
(58) Field of Search ................................. 395/680, 684, 395/682, 706, 200.33, 685, 710, 200.57–200.59, 200.61; 379/202; 717/162, 167; 719/328, 313, 330; 709/246, 203, 219, 217, 223

(56) References Cited

U.S. PATENT DOCUMENTS

| | | | | |
|---|---|---|---|---|
| 4,768,150 A | * | 8/1988 | Chang et al. ................ | 364/300 |
| 5,228,137 A | * | 7/1993 | Kleinerman et al. ........ | 395/500 |
| 5,261,095 A | * | 11/1993 | Crawford et al. ........... | 395/650 |
| 5,265,248 A | * | 11/1993 | Moulios et al. ............. | 395/650 |
| 5,404,522 A | * | 4/1995 | Carmon et al. ............. | 395/650 |
| 5,410,698 A | * | 4/1995 | Danneels et al. ........... | 395/650 |
| 5,457,797 A | * | 10/1995 | Butterworth et al. ....... | 395/650 |
| 5,537,548 A | * | 7/1996 | Fin et al. ................ | 395/200.04 |
| 5,544,318 A | * | 8/1996 | Schmitz et al. ......... | 395/200.04 |
| 5,630,132 A | * | 5/1997 | Allran et al. ............... | 395/670 |
| 5,790,423 A | * | 8/1998 | Lau et al. .................... | 364/514 |
| 5,802,304 A | * | 9/1998 | Stone ..................... | 395/200.57 |
| 5,926,624 A | * | 7/1999 | Katz et al. ............. | 395/200.47 |
| 6,560,651 B2 | * | 5/2003 | Katz et al. .................. | 709/229 |

FOREIGN PATENT DOCUMENTS

| | | | | |
|---|---|---|---|---|
| WO | WO 94/14114 | 6/1994 | ........... | G06F/13/14 |
| WO | WO 95/04968 | 2/1995 | ............. | G06F/9/44 |
| WO | WO 96/17306 | 6/1996 | ........... | G06F/15/16 |

OTHER PUBLICATIONS

B. Aldred, et al, "An Application Programming Interface for Collaborative Working", IEEE onDisc, pp. 144–151, 1993.*
P. Dewan et al, "A High–Level and Flexible Framework for Implementing Multiuser User Interfaces", ACM Trans. Inform. System, vol. 10, No. 4, pp. 345–380, Oct. 1992.*
Laursen et al., "Oracle Media Server: Providing Consumer Based Interactive Access to Multimedia Data", 5/94, SIGMOD 94.

* cited by examiner

Primary Examiner—Sue Lao
(74) Attorney, Agent, or Firm—Gray Cary Ware & Freidenrich, LLP

(57) ABSTRACT

Client-server software partitions Windows applications into multi-media and other less-observable instructions such that client may run audio/visual-related commands remotely, thereby appearing to client-user as when application were run solely by central server. Clients may access application through web-sites or remote access servers. Client requests may be atomized such that instruction set sub-sets are partitioned correspondingly. Operating system parameters on which application is run may be accessed selectably. Server may centralize client administration and provide metering of application usage.

40 Claims, 17 Drawing Sheets

CLIENT-SERVER APPLICATION PARTITIONING WITH METERING TECHNIQUE FOR DISTRIBUTED COMPUTING

BACKGROUND OF THE INVENTION

1. Field of the Invention

The invention relates to computer systems, particularly to networked computers and related software wherein processing is distributed between client and server machines.

2. Description of Background Art

Computer systems may be coupled electronically such that separate processors cooperate in a networked fashion. In client-server type networks, for example, processing tasks are distributed between a server processor and one or more corresponding client processors. An increasingly popular application of client-server technology arises in inter/intranet use, for example, when user client processors access world-wide web server processor sites.

Networked computing techniques employed for conventional distributed processing are limited, however, especially when attempting remotely to run popular software programs, such as Windows applications. Limitations include inefficient use of network channel resources, particularly when substantial media content is transferred between processors. Also, interface functionality tends to be restricted, particularly at client/user machine.

SUMMARY OF THE INVENTION

The invention resides in software for partitioning processor code transmitted between networked server and client processors associated with application programs in order to distribute execution in a multi-processor computing system. In particular, Windows application instructions transmitted between coupled processors are monitored, and, as appropriate, intercepted, for partitioning into media (e.g., any display-related instruction) and other non-media portions, whereby the media portion is run by remote machines, while the non-media portion is run by a central machine in a coordinated manner. Thus, for example, when the client computer is running display-related instructions for a particular application, its end-user effectively sees and interacts locally with the application desirably, as if the entire application program were being executed completely on the server computer (i.e., without instruction partitioning).

Preferably, clients access application programs through remote access servers or graphical internet interface, such as world-wide web browsers. Also, client requests may be atomized such that instruction sub-sets of application programs are partitioned correspondingly. Further, operating system parameters on which application programs are run may be provided selectably to limit access. Moreover, server processor may centralize client administrative tasks and provide metering to monitor client/server execution of application programs.

DETAILED DESCRIPTION OF THE PREFERRED EMBODIMENT

Figure 1:
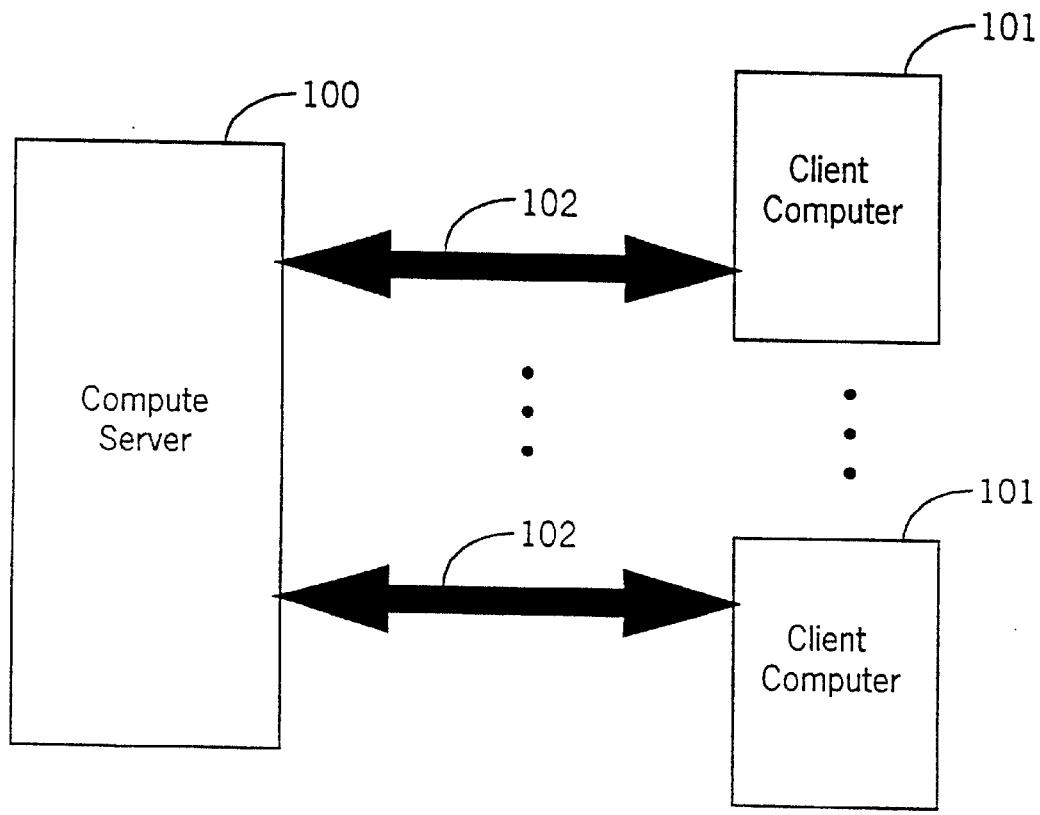
FIG. 1 is a simplified block diagram of a distributed computer system, illustrating a generalized architecture relevant to the present invention, including server 100 and client 101 processors.

FIG. 1 is a block diagram of a distributed computer system, having a generalized networked architecture, including central server 100 and one or more remote client 101 processors. Processors 100, 101 may be conventional computer equipment, such as engineering workstations or personal computers, having microprocessor, digital storage, display monitor, keyboard, and other multi-media peripheral devices, which are connectable through conventional wired or wire-less digital communication scheme, such as local or wide-area networks.

Figure 2A:
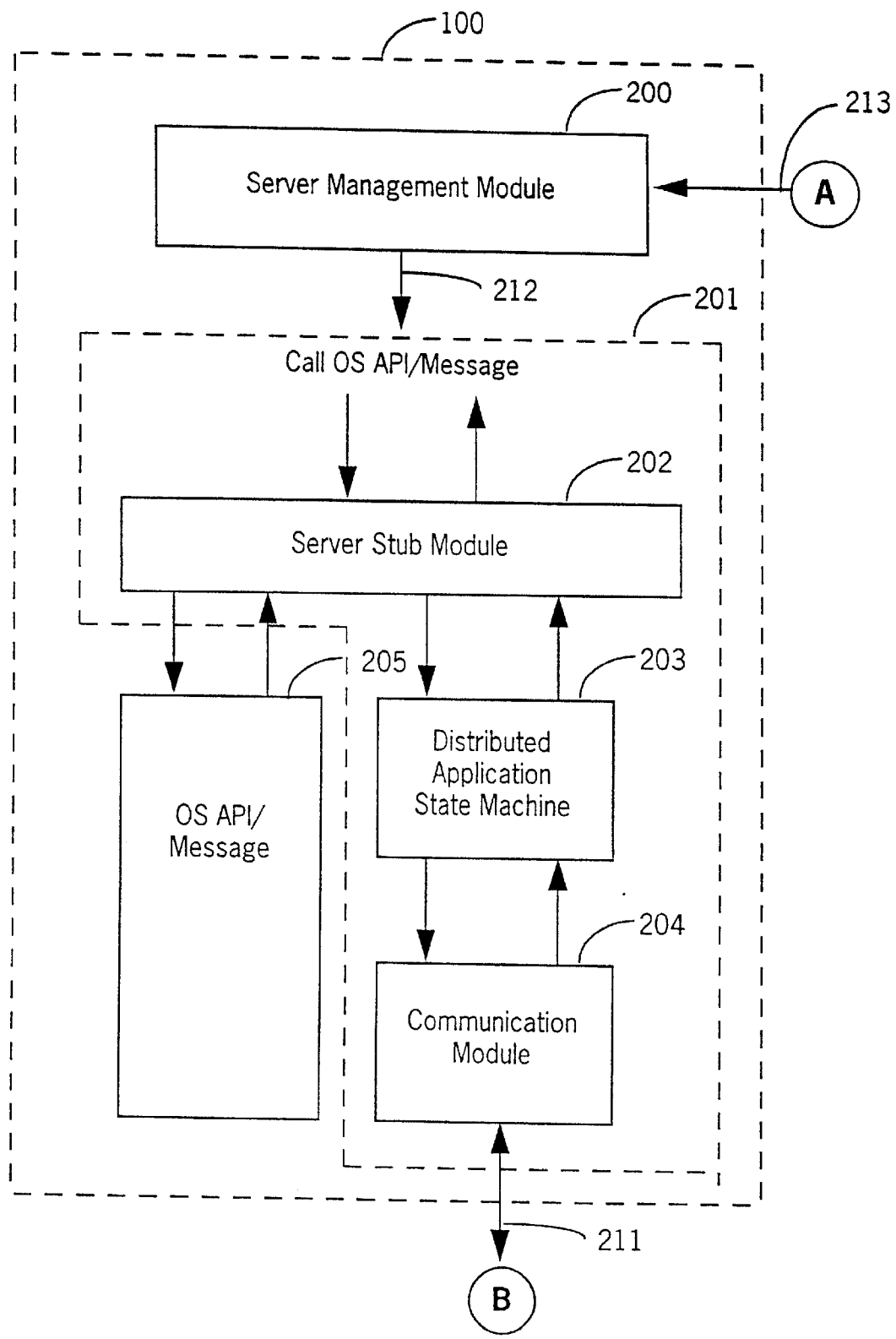
FIGS. 2A and 2B are schematic block diagrams respectively showing functional components of server 100 (FIG. 2A) and client 101 (FIG. 2B).
Figure 2B:
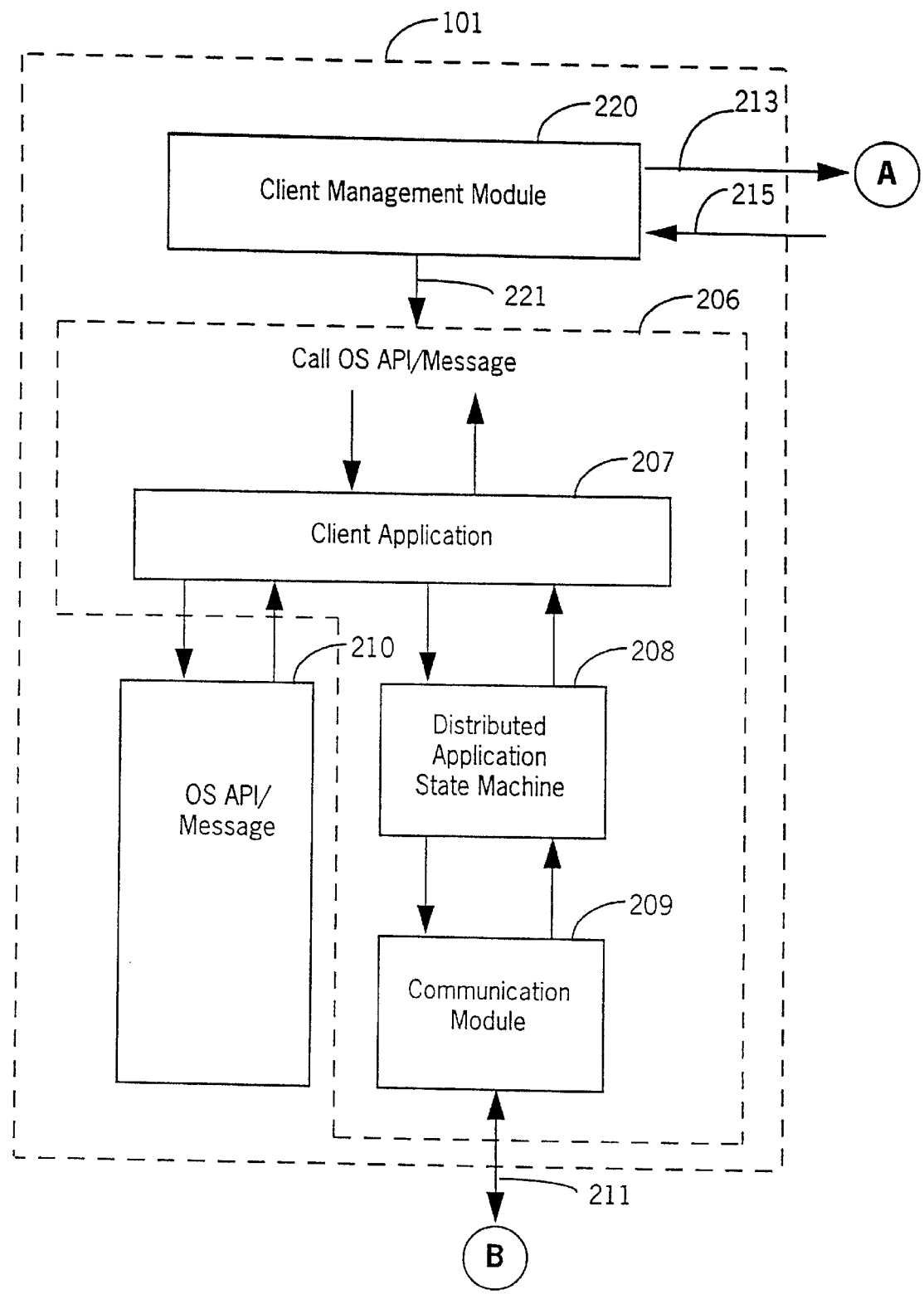

FIGS. 2A and 2B are block diagrams showing components of server 100 (FIG. 2A) and client 101 (FIG. 2B), as coupled symbolically through links "A" 213 and "B" 211. In FIG. 2A, server 100 provides in conventional digital storage various related software, including server management module 200, call operating system (OS) application procedure interface (API)/message module 201, and OS API/message module 205, which essentially includes operating system kernel and user interface (e.g., graphical, audible) components. Module 201 couples through 212 to module 200 and includes server stub module 202, distributed application state machine module 203 and communication module 204.

Similarly in FIG. 2B, client 101 provides in conventional digital storage various related software, including client management module 220, call OS API/message module 206, and OS API/message module 210, which essentially includes operating system kernel and interface components. Module 206 couples through 221 to module 220 and includes client application or stub module 207, distributed application state machine 208 and communication module 209. Applications performed desired actions through a combination of user instructions and operating system (OS) instructions. OS instructions occur through API calls with associated parameters and messages with parameters. Generally, the use of messages is similar to APIs, which may have more parameters than messages.

Module 201 represents the component enabling the partitioning of a pre-existing binary program into client and server pieces. Module 206, the client application, is a generic program which takes the visual/aural form of whatever is contemplated by the application through the OS API/Message interface.

Although functionality of modules 200,201,205 in server 100 and modules 220, 206, 210 in client 101 are implemented preferably in software, it is contemplated that any digital or analog logic of such functionality, as described herein, may be implemented in equivalent firmware/hardware, including commercially-available application-specific integrated circuits (ASIC), for example, thereby providing accelerated instruction partitioning, client-server information transfer, or OS device drivers. A firmware/hardware implementation may be realized because the modules making up 100 and 101 may be written in a language (e.g., assembly, C) which can be translated into 1) code which can be embedded into firmware or 2) a hardware description language (e.g., Verilog or Very High Definition Language—VHDL) which may be used to realize a discrete hardware implementation or an integrated solution in the form of an ASIC.

Figure 3:
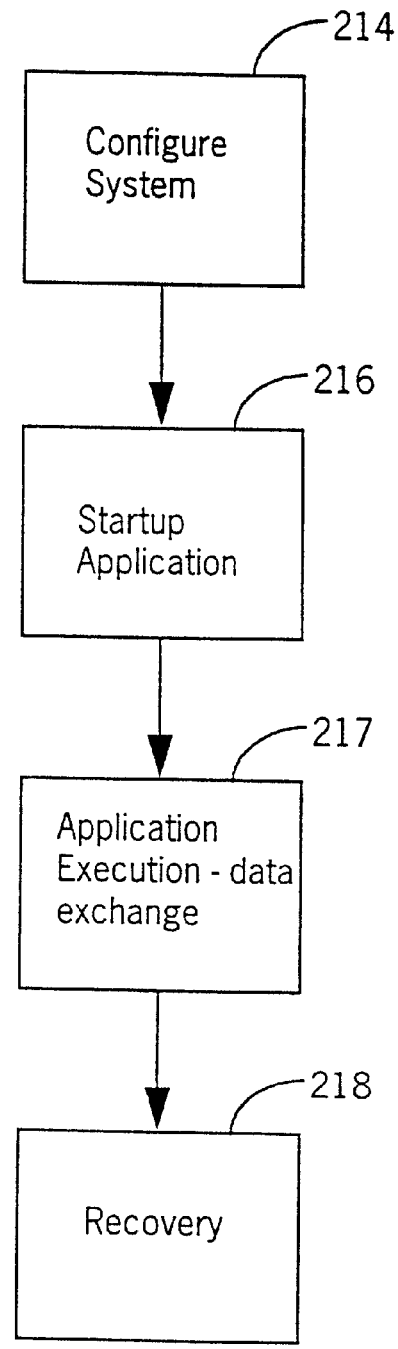
FIG. 3 is a simplified flow chart illustrating general client-server functionality according to the present invention.

FIG. 3 shows general flow according to the present methodology. Initially, client-server system is configured 214, application is started 216, application executed and data exchanged 217, then as appropriate recovery procedure 218. System configuration includes loading various modules making up this invention, the protocol for communication, as well as setting OS parameters necessary for the client/server facility to function. Applications may be started through standard techniques or through a WEB browser connected to a WEB home page. The application need not reside on the same machine from which it was invoked. Application execution and data exchange are the set of operations employed to execute existing applications in a client/server fashion. Recovery is invoked when a failure has occurred such that the client and server components are disconnected and cannot maintain a consistent user interface (i.e., aural or graphical) state. Recovery enables the client to re-synchronize the user interface state to the one maintained on the server.

In accordance with an important aspect of the inventive improvement, software is provided for partitioning application instructions to be sent between server and client processors 100, 101 in order to distribute execution of instructions. Any application (e.g., Windows 3.1/95/NT, MacOS, UNIX, JAVA, etc.) instructions transmitted between networked processors are evaluated, and, as appropriate, intercepted, thereby partitioning certain instructions into executable media instruction or command portion (i.e., any instruction for generating user-observable graphical, audio, or video-related information) and other non-media instruction or command portions. An objective is to deliver client functionality effectively as a media viewer or communicator.

Applications where the server's OS and/or processor are different from the client's may be made to co-operate by enabling the client application 207 to map OS/API calls from different servers to client procedures which translate the OS/API call to the appropriate call or calls available from the client OS. For example, the server OS may support a compound line drawing command (i.e., drawing multiple lines from a single command). The client may only support a single line drawing command. The client application 207 takes the compound drawing command and breaks it into multiple single line drawing commands. The client needs only to know how to interpret the compound command which can be programmed as part of the client application.

Furthermore, other media, e.g., audio and video, may be handled in a similar fashion as described above. For example, a server using appropriate algorithms may compress a stream of audio/video by breaking the stream into a series of indices which point to a method of encoding along with the parameters necessary to decode the data. A client receives a series of commands identifying the method for decoding and the parameters. Executing or remapping the commands to those available on the client enables reconstruction and/or modification of the audio/video stream. Other uses of audio or video which may be handled in a similar fashion include processing OS/API commands as a result of responses from audio or video prompting. Here, the server application makes an OS/API call with parameters resulting in an audio or video image to be made to the user of the client, and the expected return value from the client to the server application is the response to the audio/video prompt.

Thus, by running media portion on one or more "thin" (possibly disk-less) client machines 101, while non-media portion is run by central server machine 100, in coordinated technique maintaining necessary client/server state information as detailed herein, channel resources are used more efficiently to transfer media content between networked processors, and client interface is functionally less-restricted. For example, when client 101 remotely runs display-related graphical display instructions (i.e., GDI and USER only, without other non-graphical instructions) for any Windows application, client's end-user effectively experiences the application locally through common interface without reduced functionality, in the same manner as when entire set of un-partitioned application instructions were executed completely on single machine. Clients 101 may collaborate by sharing common files and access application programs through remote access servers or graphical internet interface, such as world-wide web browsers.

Furthermore, client requests may be "atomized" (i.e., reduced to sub-set requests for executing application instructions,) such that instruction sub-sets are partitioned and executed independently of other subsets. This enables subsets to be executed on different processors. For example, an existing MS Windows application may be partitioned into components which may be encapsulated into ActiveX or JAVA objects. These objects may then be activated on different processors in the same or different locations in different applications. For example, the toolbar associated with the fonts on Microsoft applications could be atomized and used on Word, Excel, Powerpoint, etc.

OS/API parameters on which application programs are run may be provided selectably to disable general access. This provides a method for the OS to hide information. This may be implemented by storing the actual information in a location protected by the operating system and addressing it indirectly through a pointer. This pointer would be an OS/API parameter. Attempts to access the data through the pointer without proper rights would result in an access violation error.

Finally, server 100 may centralize tasks for system administration of clients 101 and provide metering to determine extent of program execution by client 101 and server 100. Centralized system administration of applications includes the ability to dynamically monitor an application and its use of resources. For example, an SNMP MIB may be implemented in the Server Stub Module 202 to enable standard system administration tools such as HP Openview or IBM Netview to monitor the data being collected by the MIB on the application.

Preferably, server management module 200 provides centralized administration of network system management tasks, for example, for file-version updates, electronic mail facilities, and data-warehousing services, thereby maintaining general consistency among server 100 and associated clients 101. Moreover, server management module 200 may monitor and record usage activity and patterns of client and server processors 100, 101 in executing applications, thereby providing metering to enable, for example, user billing on basis of execution transactions. In this manner, client usage of particular applications may be limited or secured. Upon detection of client-server disconnect, metering is halted, and recover procedure 218 is initiated as described herein. Further, to limit ability to run applications (e.g., media-related commands on client 101, or non-media related commands on server 100), parameters of operating system component 210, 205 may be selectably altered or disabled as described above.

Figure 4:
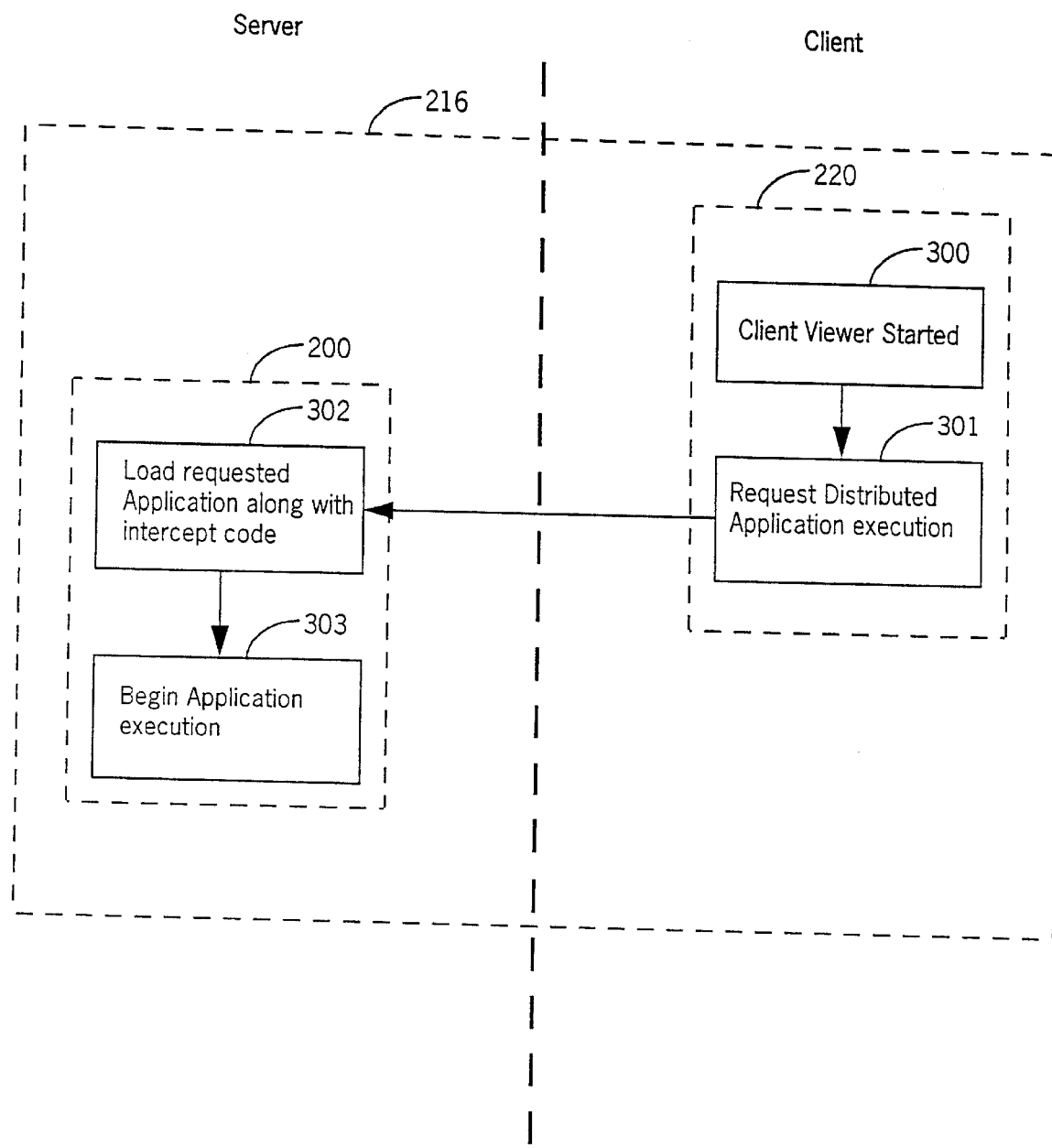
FIG. 4 is a schematic flow chart showing client-server interaction during application startup 216.

FIG. 4 is a functional diagram showing server-client interaction between server management module 200 and client management module 220 during application startup 216. Initially, client management module 220 is executed by client 101, wherein client viewer is started 300, then distributed application execution is requested 301. To reduce processing and storage loading associated with larger Windows applications, for example, application instructions may be atomized or fragmented into self-contained sub-sets or applets to be executed separately as described above. Server 100 then runs server management module 200, wherein requested application is loaded into address space along with intercept code 302 (i.e., server module 201), then application execution is started 303.

Client requests to initiate application programs may be started either from remote access server/local area network or world-wide web browser coupled 215 to an appropriate network, such as public Internet, as long as both client-server are accessible thereto. Applications can be started through a web browser by establishing an Hyper Text Markup Language (HTML) link on a home page representing the target server application. Activating this link, the client is started as a helper application or directly in the browser. The client locates the server and the target application from the information contained in the document associated with the HTML link. The location of the server need not be located on the same machine as the web server.

Figure 5A:
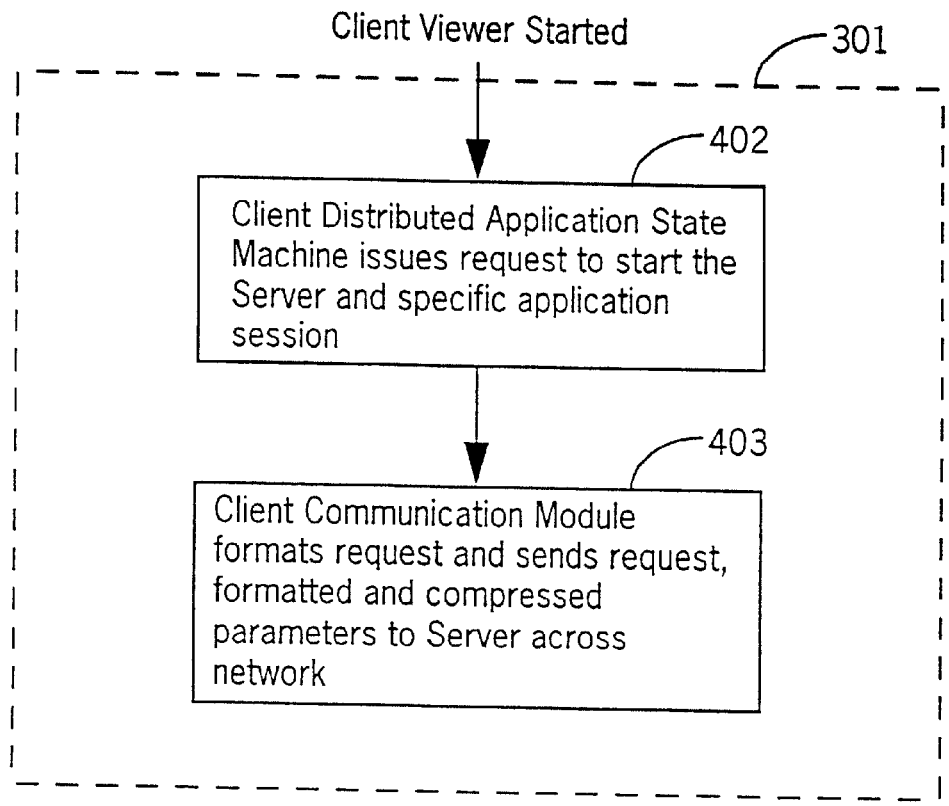
FIGS. 5A and 5B are flow charts respectively showing functional steps associated with requesting execution of distributed application 301 by client (FIG. 5A) and server (FIG. 5B).
Figure 5B:
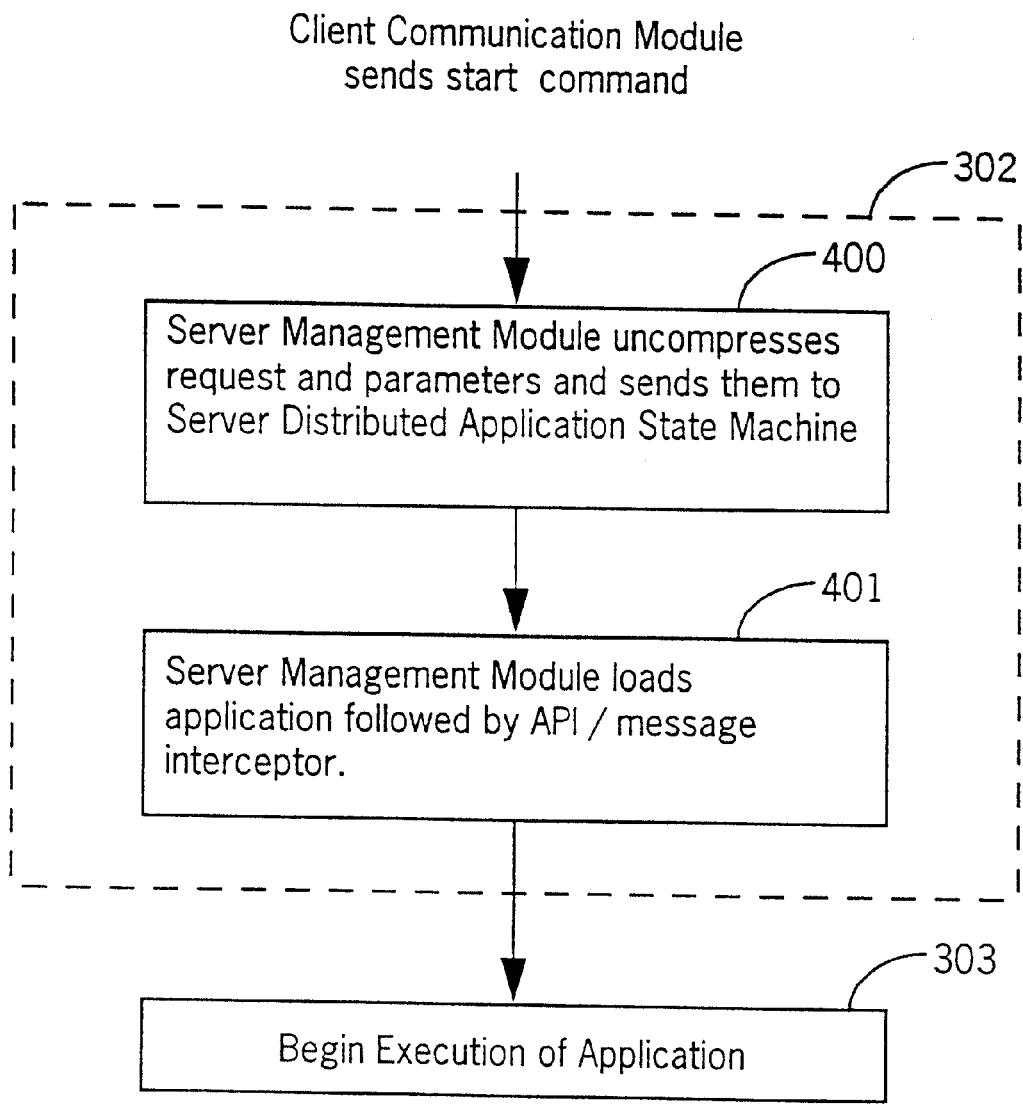

FIGS. 5A and 5B are flow charts showing steps during execution request for distributed application 301 by client (FIG. 5A) and server (FIG. 5B). When the client management module 220 requests that the client viewer 301 start, client distributed application state machine 208 issues request to start server 100 and specific application session 402, then client communication module 209 formats request and sends request, formatted and compressed parameters to server 100 across network. When client communication module 209 sends start command 301, server management module 200 un-compressed request and parameters and sends them to server distributed application state machine 203, then server management module 200 loads application into address space followed by API/message interceptor code 201. Then, application execution is started 303.

Multiple clients 101 may interact with server 100 such that clients 101 collaborate by sharing through an identical multimedia user interface for a given instance of an application running on a server. When a user identifies a server application instance as collaborative, the OS/API commands from the server are sent to all clients identified as collaborating. The clients create a substantially identical multimedia user interface by interpreting commands from a server application at nearly the same time. This effectively provides direct application collaboration of existing binary application programs.

Furthermore, interoperability between locally executing and remotely executing programs is effectively seamless. This is also true between multiple remotely executing applications through standard inter-process communications (IPC) protocols. For example, Object Linking and Embedding (OLE), Dynamic Data Exchange (DDE) format, and clipboard all represent methods used by Microsoft applications to enable sharing between different applications in accordance with present inventive technique. These IPC protocols are enabled by the application writer and can be invoked only if the application supports it. Clipboard requires direct user intervention while DDE and OLE may be automatically invoked.

Figure 6:
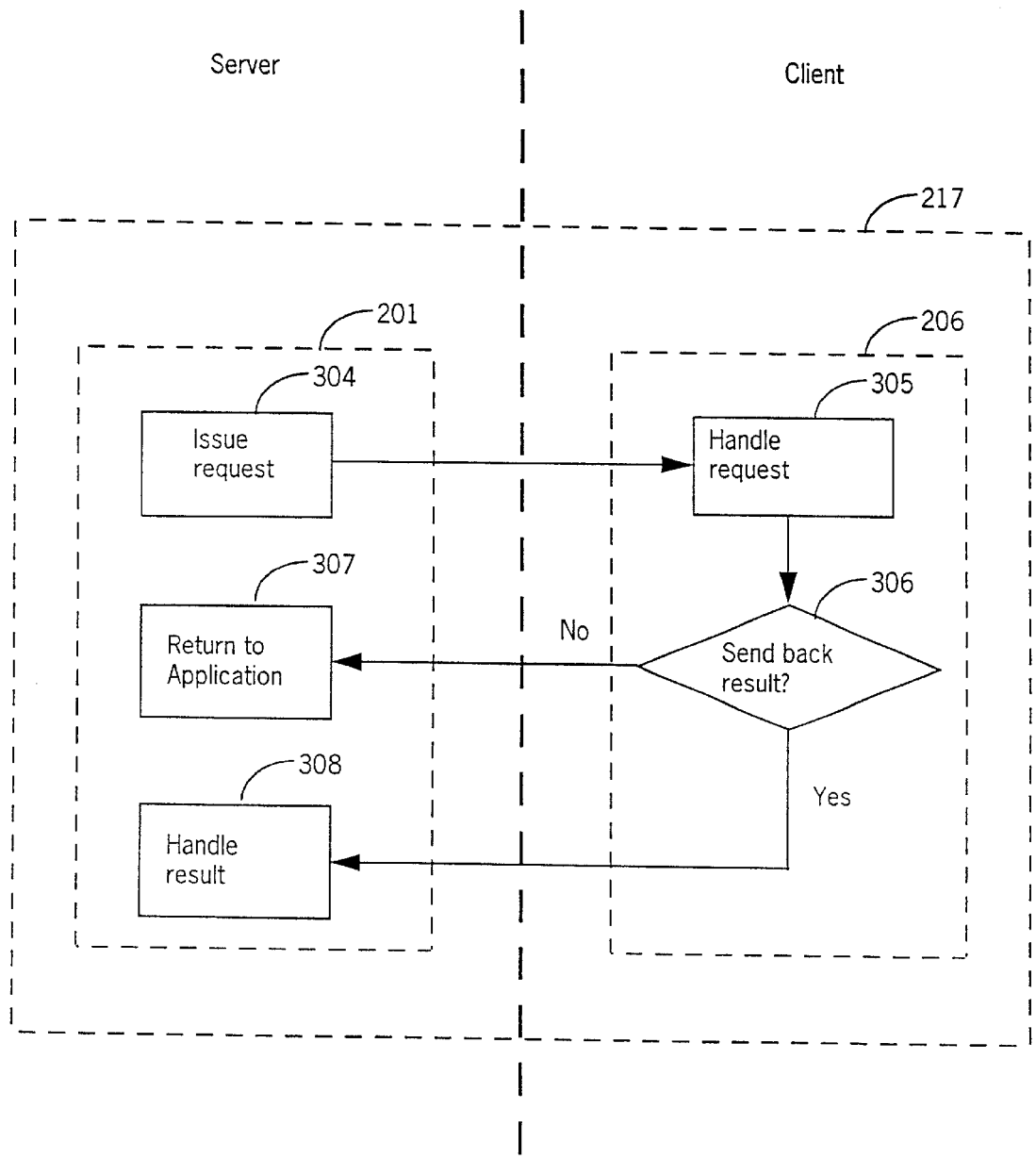
FIG. 6 is a schematic flow chart showing client-server interaction during application execution/data exchange 217.

FIG. 6 is a schematic flow chart showing client-server interaction between server call OS API/message module 201 and client call OS API/message module 206 during application execution/data exchange 217. Server module 201 issues request 304, then client module 206 handles request 305. Client module 206 decides whether to send back result 306; if yes, server module 201 handles result 308, otherwise return to application 307. In this exchange 217, bi-directional media transfer between client and server effectively enables client-server computing for multiple clients using different applications and multiple clients using the same instance of an application (i.e., application collaboration) including audio and/or video information dialogue as described above.

Figure 7A:
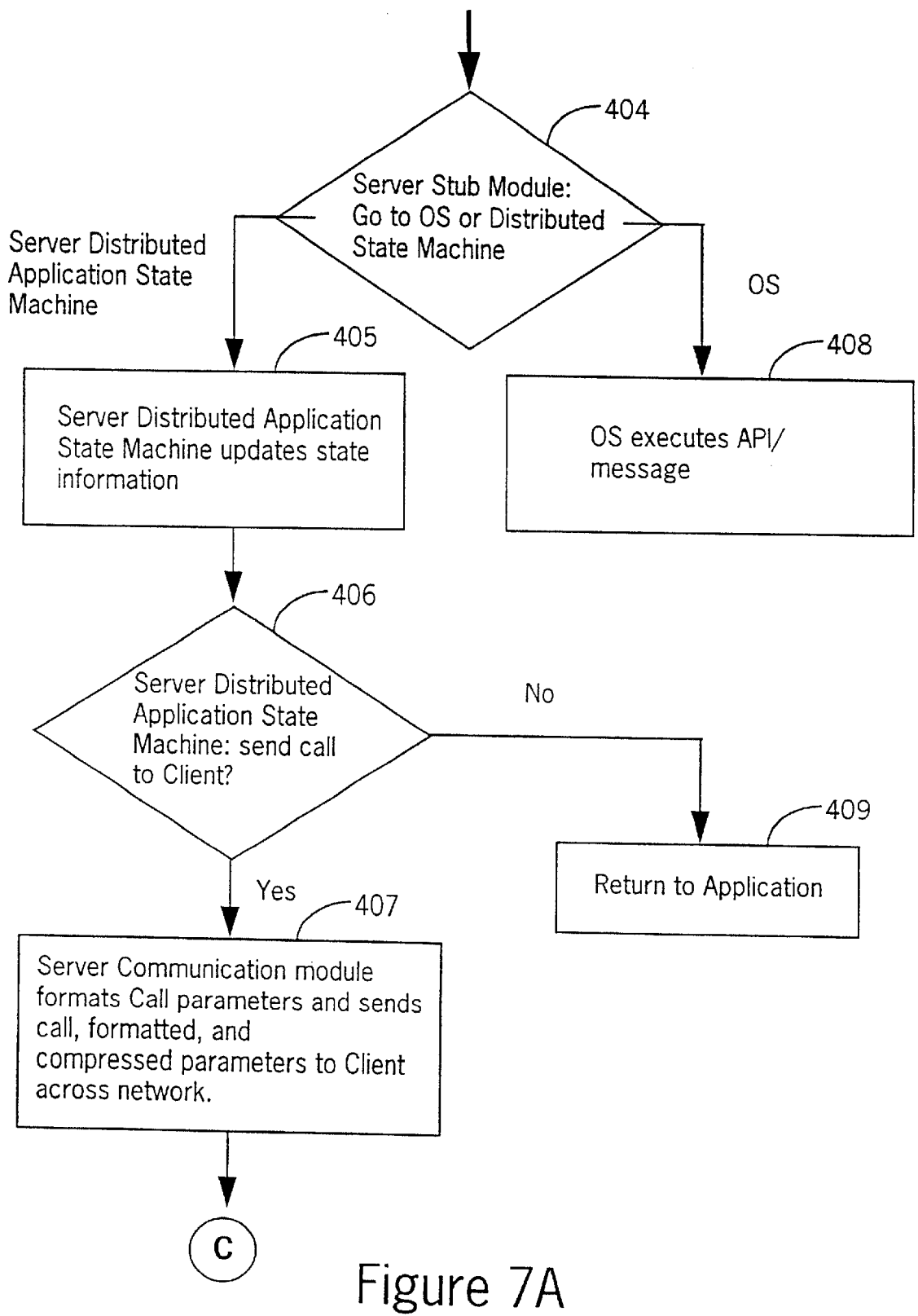
FIGS. 7A, 7B and 7C are flow charts respectively showing functional steps associated with calls to server (FIG. 7A) by client (FIG. 7B) and in response therefrom (FIG. 7C).
Figure 7B:
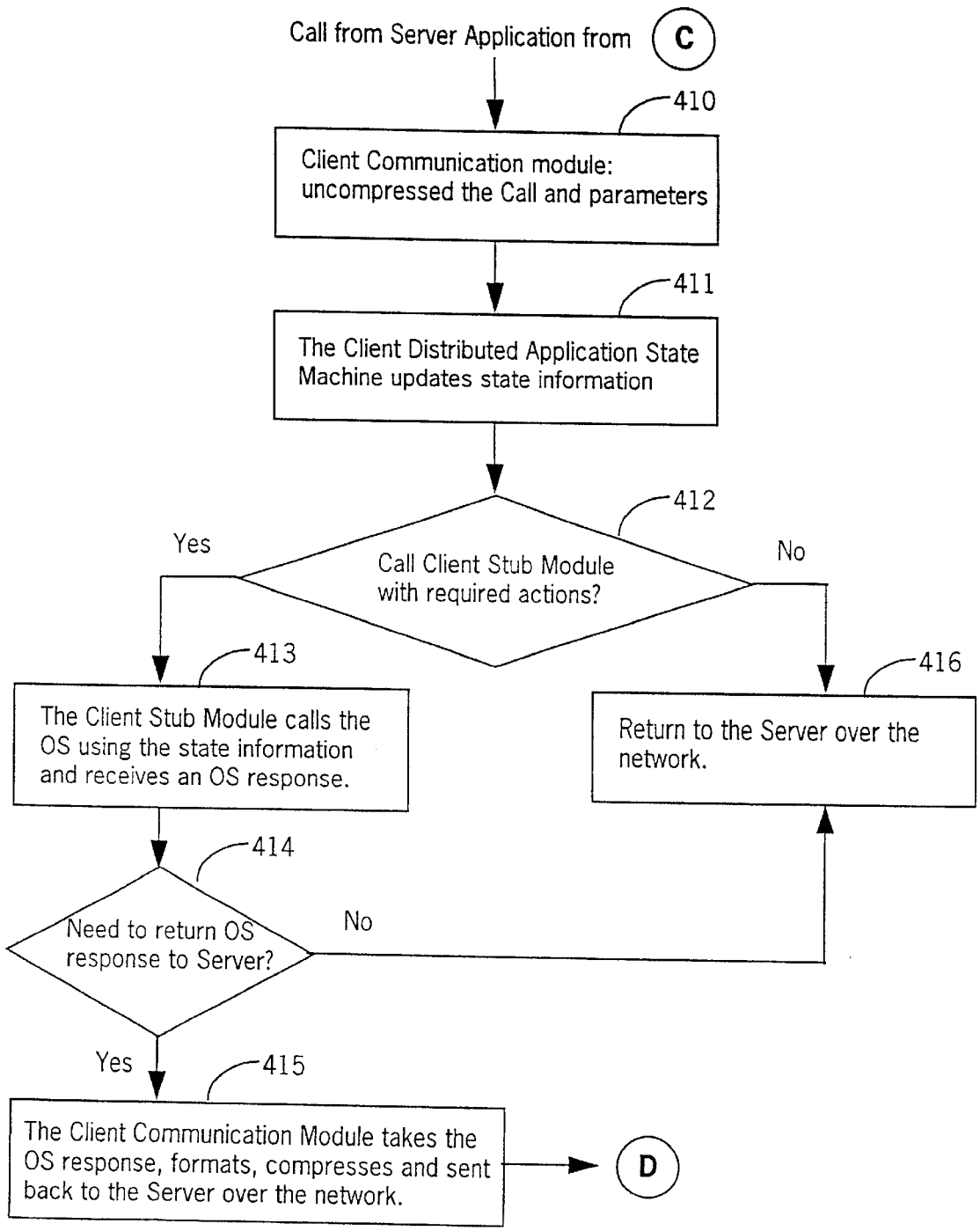
Figure 7C:
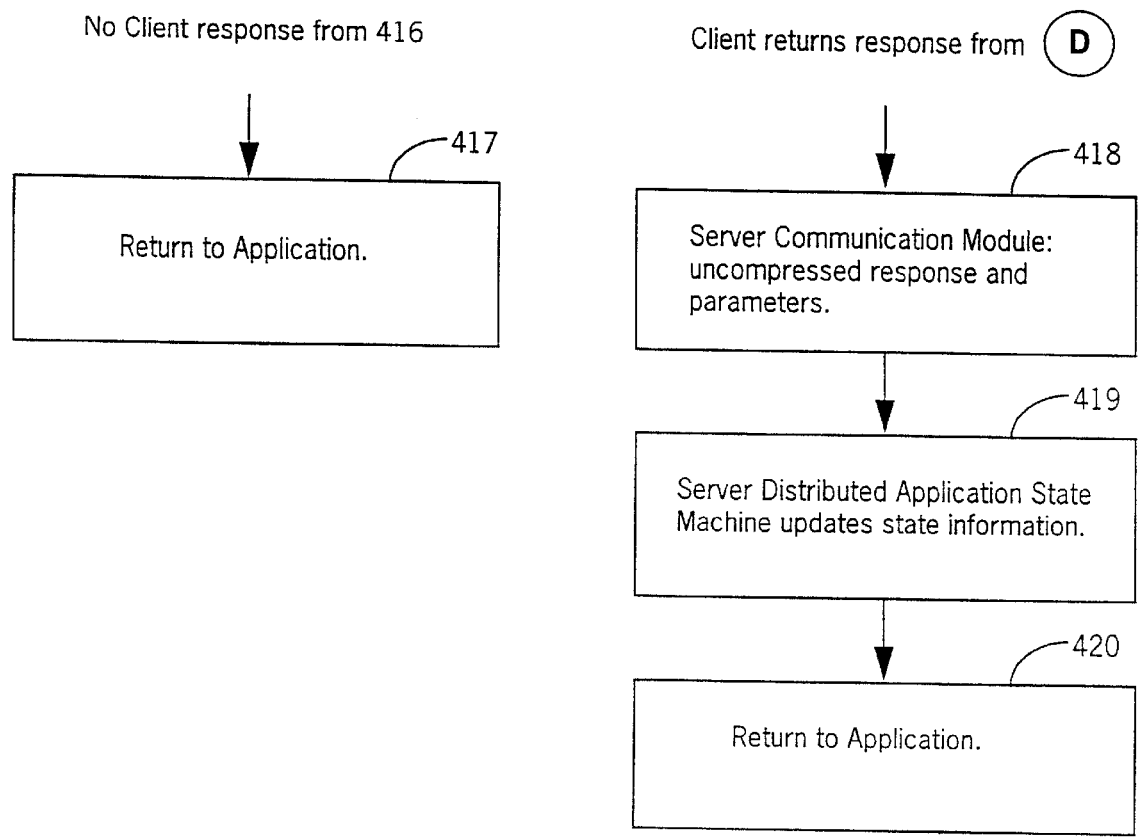

FIGS. 7A, 7B and 7C are flow charts showing functional sequence during calls to server by client and in response therefrom. In FIG. 7A, during OS API call or message by server application, initially server stub module 202 decides 404 whether to go to OS 205 or distributed application state machine 203 in accordance with novel algorithm for partitioning application instructions for execution by client 101 or server 100.

Preferred partitioning criteria for intercepting application instructions involves keeping as much of instruction processing on server 100, and only send to clients 101 instructions necessary to deliver and fully construct desired sensory output (e.g., graphical, audio, video, etc.), while maintaining related states. Such states include elements (e.g., data structures, bitmaps, audio compression parameters, etc.) to represent and re-create the visible and/or audible portions of a user interface. Because instructions/commands are intercepted, and thereby partitioned, at the API level, (i.e., in server, between operating system 205 and server intercept code module 202; or in client, between operating system 210 and client intercept code module 207), satisfactory performance in distributing computing is achieved, particularly when high-level GDI/USER or multi-media calls effectively eliminate delays associated, for example, with sending and processing raw bit-map data. For example, a circle can be represented as a bit map or as a point and a radius. The latter requires substantially less network bandwidth to realize the circle on the client.

If OS 205 selected (i.e., no interception), OS executes 408 API/message; else if server distributed application state machine 203 selected (i.e., intercept instruction), then server distributed application state machine 203 updates 405 state information. Then, server distributed application state machine 203 decides 406 whether to send call to client 101. If yes, then server communication module 204 formats call parameters and sends 407 call, formatted, and compressed parameters to client across network; else if no, then return to application. In this event 409, certain instructions may not be executed if they would have generated undesirable or un-necessary API/messages for server and/or client. For MS Windows, an example of an undesirable and unnecessary message from the server to the client would be a WM_ACTIVATE. This message needs to be sent from the client to the server in order to notify an application that it has received focus client. The computational portion of the application is running on the server and it may need to process that event. Sending the message from the server to the client is unnecessary and possibly undesirable because the client will have already received the message locally and having the client process the message again may cause an incorrect result on the user's desktop.

Fundamentally, partitioning is achieved by intercepting calls to target OS APIs. Interception is performed at runtime, without the application's knowledge, by modifying the application's memory pointing to the target OS APIs during program initialization and later execution with other addresses pointing to procedures located in Server Stub Module 202. Modification of the application is possible by loading a procedure which will modify addresses with the application and insuring that the address modification procedure is called before the application is called.

In FIG. 7B call from server application, step 407 is followed symbolically through link "C" by client communication module 220 uncompressing 410 call and parameters, and client distributed application state machine 208 updates 411 state information. Then, decide 412 whether to call client stub module 207 with required actions. If yes, client stub module 207 calls OS using state information and receives OS response 413, then decide 414 whether need to return OS response to server 100; if yes, then client communication module 209 takes OS response, formats, compresses and send back to server 100 over network. Else, if decide no at step 414 or 412, then return 416 to server 100 over network. In this event 416, some commands from server may be ignored by client, for example, if the command causes the user interface to behave in an unexpected manner (e.g., incorrect graphical user interface) for client. Additionally, some return values from calling OS are not sent to the server. For example, if the OS/API command has been executed on the server before being sent to the client and the return value from the server OS/API execution is available, the return value from calling the OS on the client is not needed.

In FIG. 7C, server communication module 204, maintains knowledge of whether a call 407 will result in no client response from step 416, return to application 417, or when client returns response from step 415, symbolically following link "D". Server communication module 204 un-compressed 418 response and parameters, server distributed application state machine 203 updates 419 state information, then return 420 to application.

Figure 8:
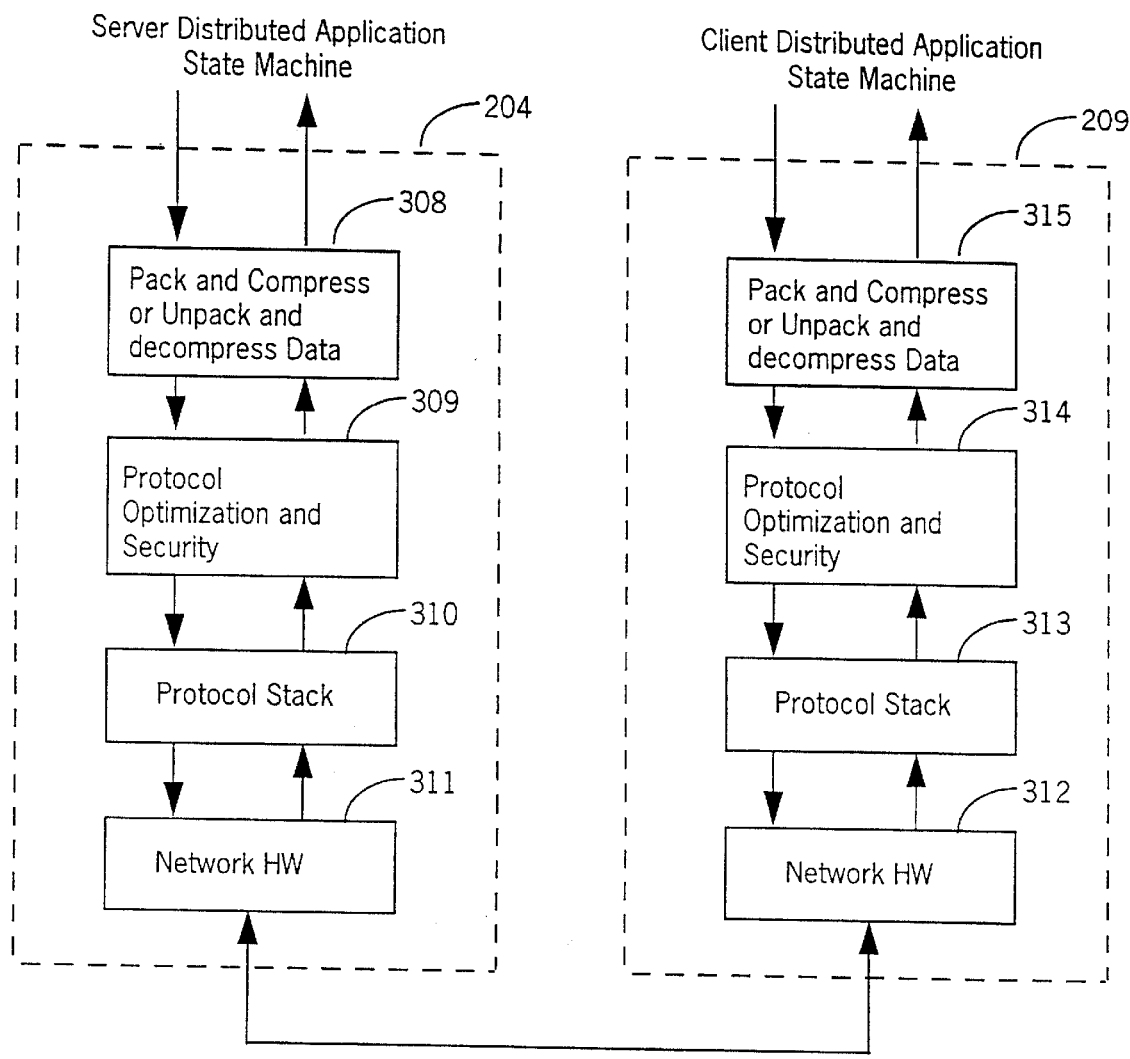
FIG. 8 is a schematic flow chart showing client-server interaction between communication modules 204, 209.

FIG. 8 shows compatible bi-directional functionality of server/client communication modules 204, 209, respectively including pack and compress or unpack and decompress data 308, 315; protocol optimization and security 309, 314; protocol stack 310, 313; and network hardware 311, 312. As such, communication modules 204, 209 may couple to standard modems or other wireless network service, for example, and digitally interconnect server 100 and clients 101 through conventional network communications schema.

Figure 9:
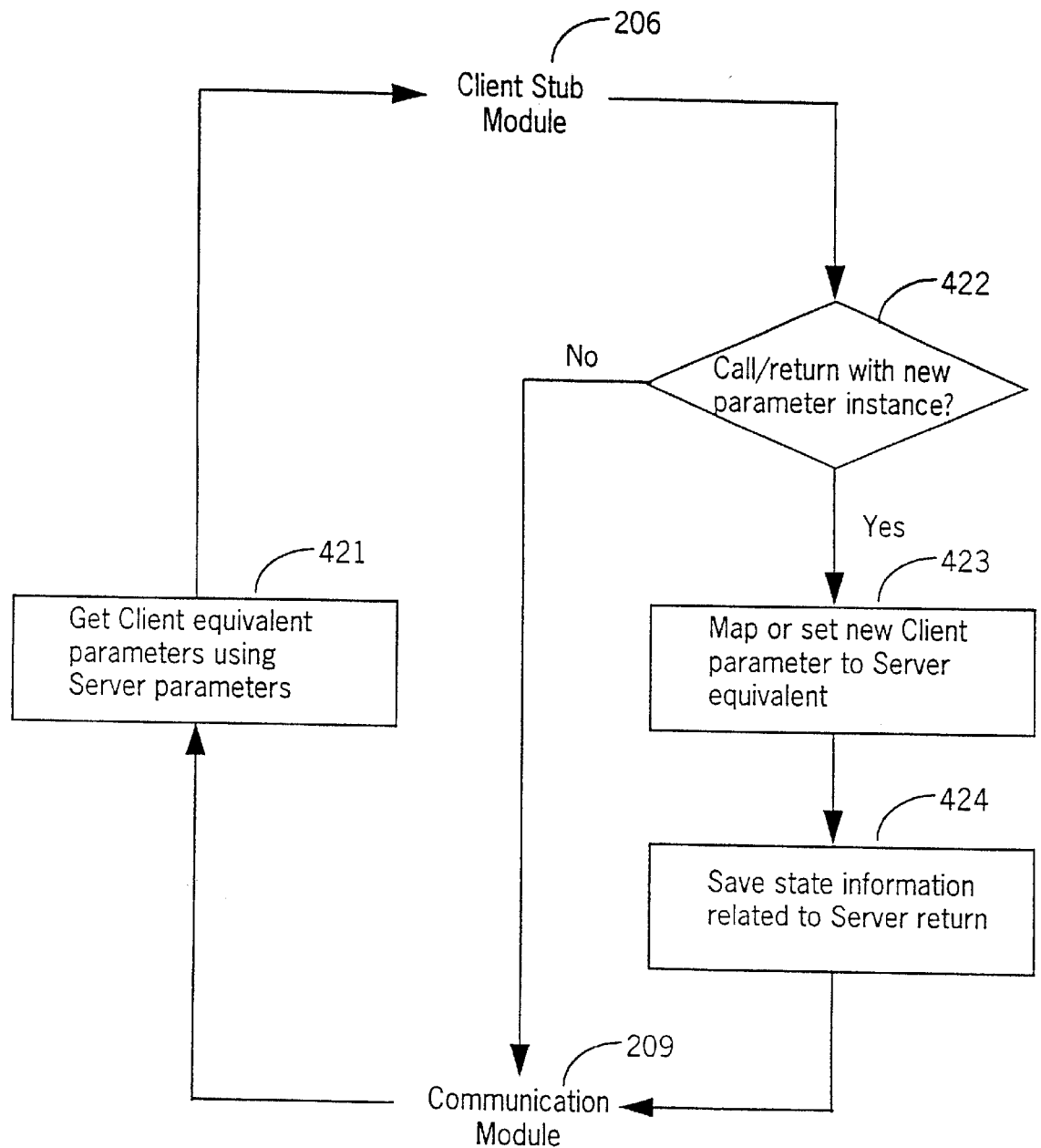
FIGS. 9 and 10 are a flow charts respectively showing functional steps associated with state-information processing by client (FIG. 9) and server (FIG. 10).
Figure 10:
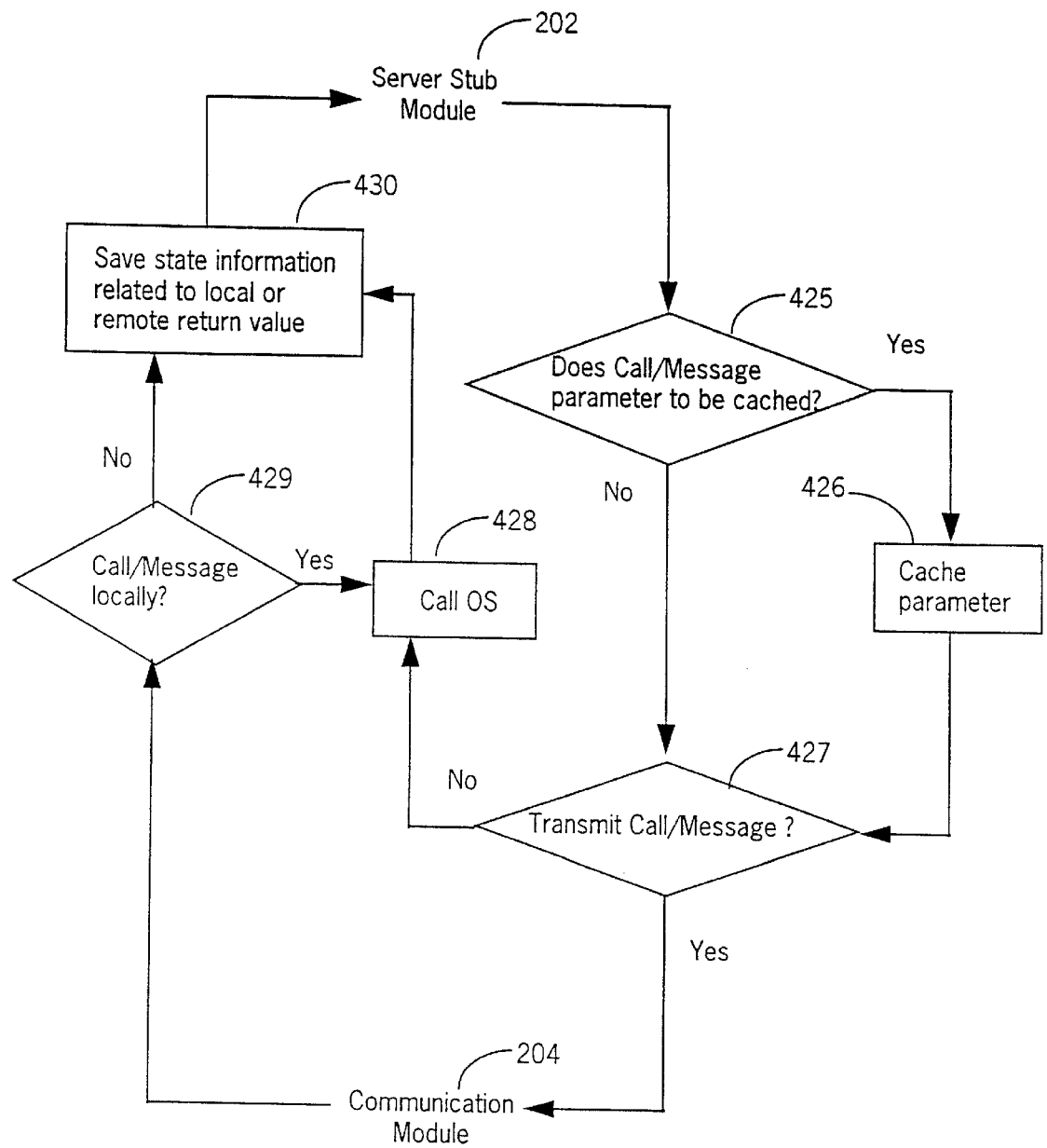

FIGS. 9 and 10 show functional steps for state-information processing respectively by client 101 and server 100. As necessary, local client media state is maintained and mapped in coordination with corresponding server execution elements. In FIG. 9, client call OS API/message module 206 causes client stub module 207 to decide 422 whether to call/return with new parameter instance (i.e., return value or message parameter). If yes, then map or set new client parameter to server equivalent 423, then save state information related to server return 424. Otherwise, continue through client communication module 209, then get client equivalent parameters using server parameters 421. When display resources are limited for local redraws, for example, local client parameters may be cached for performance. Parameters may include programmatic representations of graphical, sound, video, or other observable media-related objects in the form of handles or the actual objects themselves. Compressed bit maps and metafiles are examples of graphical objects; compressed wave files are examples of audio objects; and a Motion Picture Expert Group (MPEG) encoded file is an example of a video objects. Other resources may be maintained by the OS 205 and 210 thereby enhancing application performance and usability.

In FIG. 10, server stub module is caused to decide 425 whether locally to cache call/message parameter. If yes, then cache parameter 426. Then, decide whether to transmit call/message 427. If yes, continue through server communication module 204 to transmit the call/message to client 101. If an API/message is received from the client then decide 429 whether call/message locally. If decide yes at step 429 or no at step 427, then call OS 428. Then otherwise, save state information 430 related to local or remote return value, and return through server stub module 202.

Figure 11:
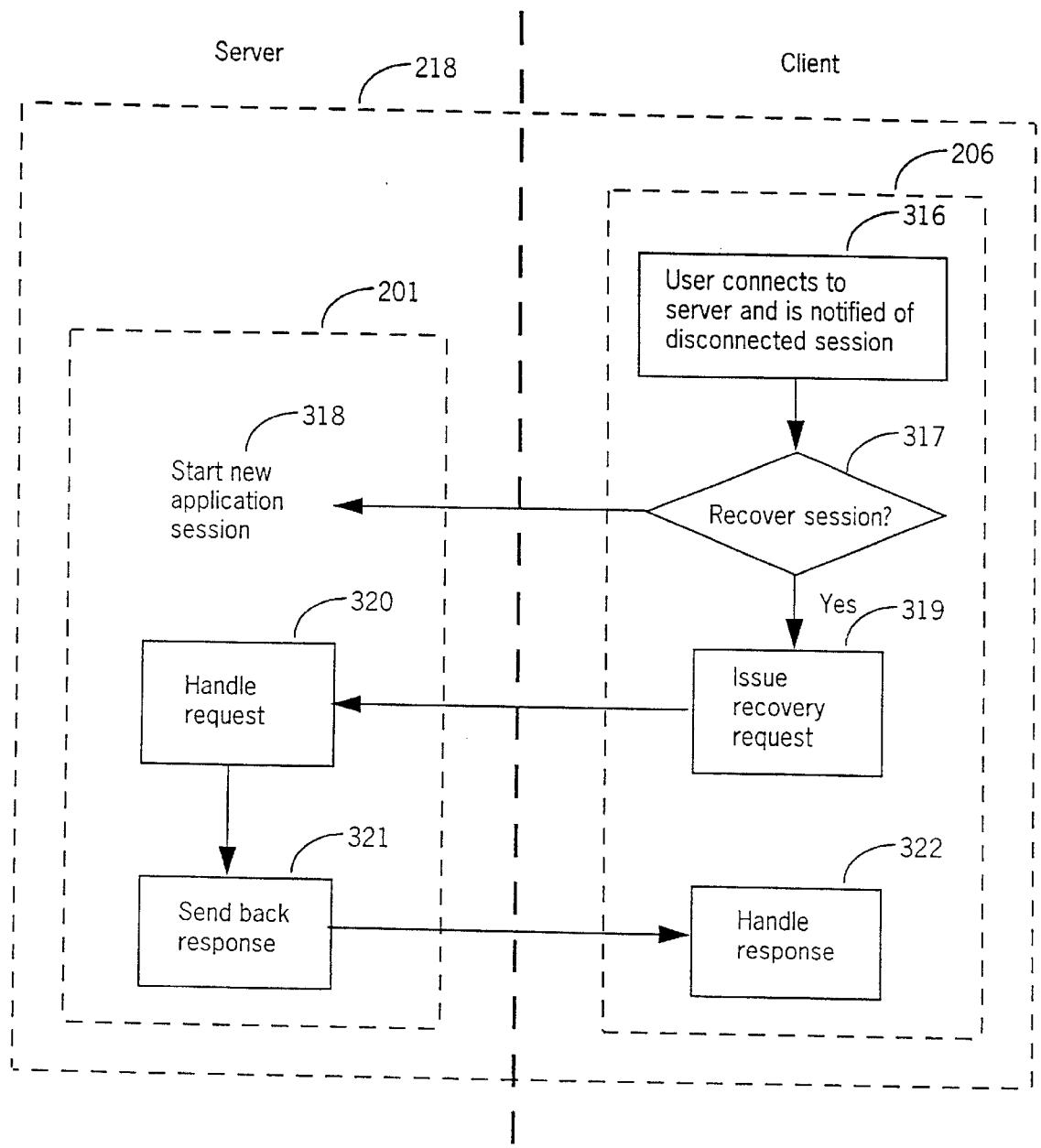
FIG. 11 is a schematic flow chart showing client-server interaction during recovery 218.

FIG. 11 shows interaction between server call OS API/message module 201 and client call OS API/message module 206 during recovery 218, for example, when wired or wireless communication disconnect is detected between client-server. Initially, user connects to server 100 and is notified of disconnected session 316. Client module 206 decides whether to recover session 317. If yes, client module 206 issues recover request 319, and server handles request 320 and sends back response 321, otherwise server starts new application session 318. Client module 206 handles response 322.

Figure 12A:
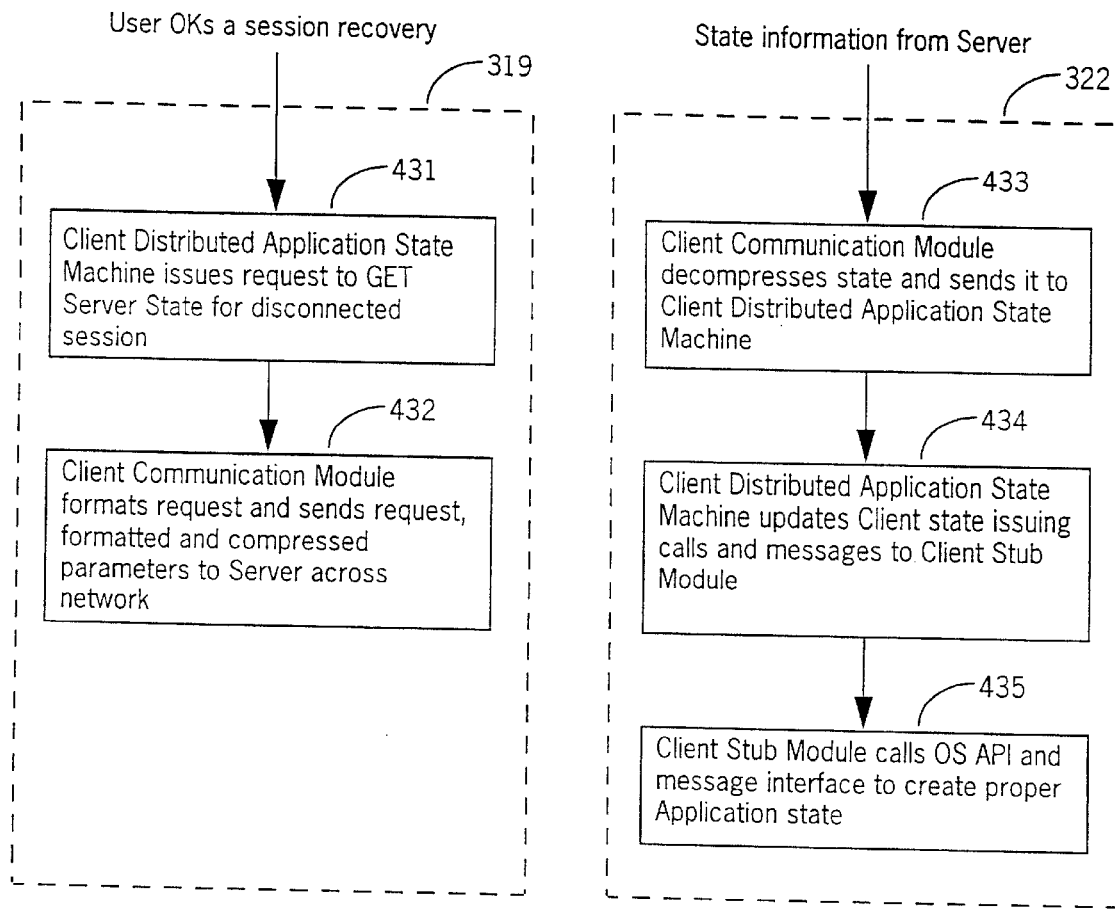
FIGS. 12A and 12B are flow charts respectively showing functional steps associated with recovery processing by client (FIG. 12A) and server (FIG. 12B).
Figure 12B:
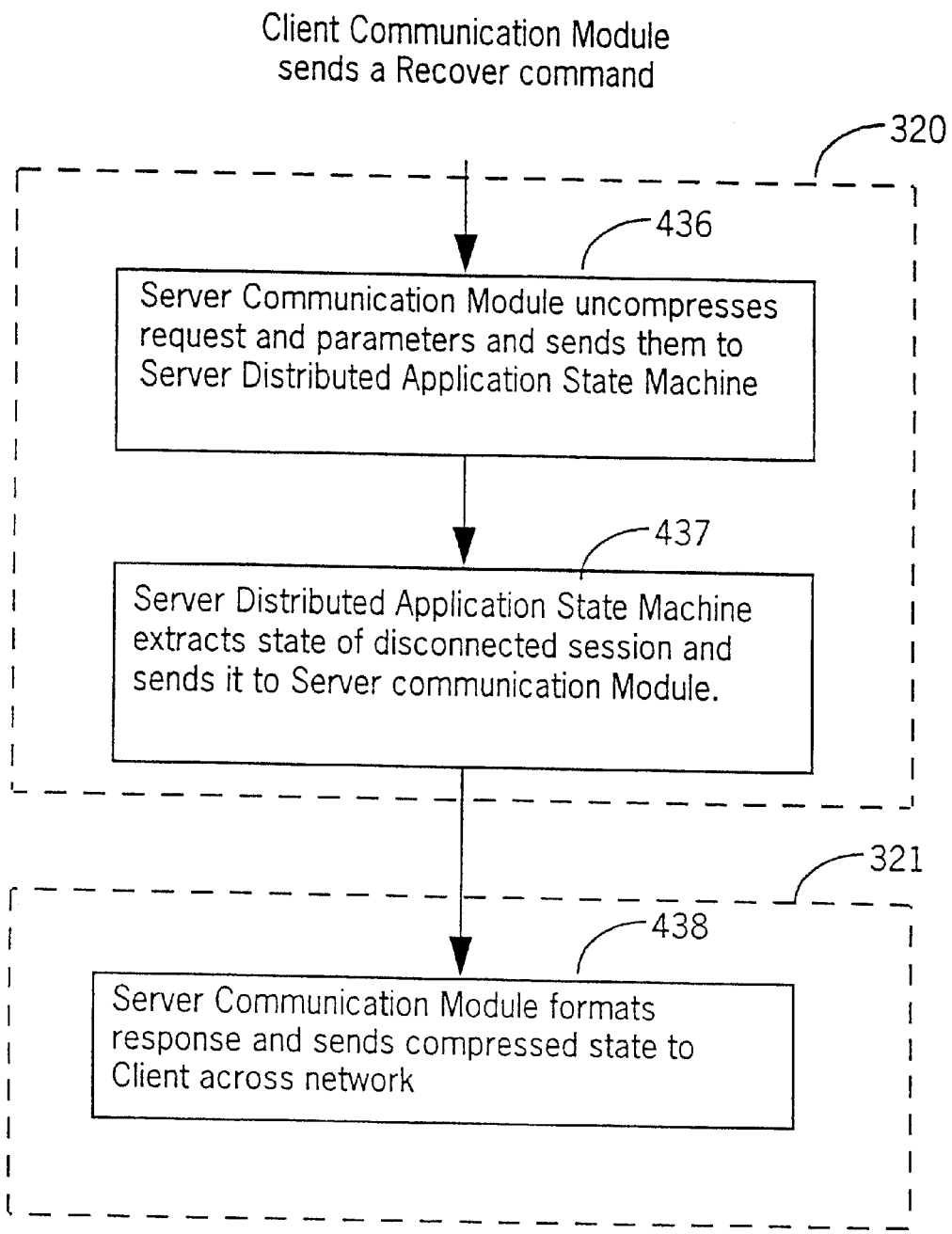

FIGS. 12A and 12B show further recovery steps 319, 322 and 320, 321 respectively by client 101 and server 100. In FIG. 12A client recover request, user approves session recovery 319, client distributed application state machine 208 issues 431 request to get server state for disconnected session, and client communication module 209 formats request and sends request, formatted and compressed parameters to server 100 across network. Also, upon state information response handling from server 322, client communication module 209 decompresses state and sends to client distributed application state machine 208, and client stub module 207 calls OS API and message interface to create proper application state 435. The server distributed application state machine 203, maintains a consistent known state for application running on the server 100 and visible to client 101. Preferably, upon recovery, disconnected client processors 101 are returned to last-known media/audio-visual state as described for FIGS. 7A, 7B, and 7C above.

In FIG. 12B, client communication module 209 sends recover command upon server handling request 320, wherein server communication module 204 un-compressed request and parameters and sends to server distributed application state machine 203, and server distributed application state machine 203 extracts state of disconnected session and sends to server communication module 204. Then, upon sending back response 321, server communication module 204 formats response and sends compressed state to client 101 across network.

What is claimed is:

1. A method for executing a software application in a distributed computing system having at least first and second processors, each of the processors executing operating system software, comprising the steps:

executing the software application on the first processor, the software application having a plurality of portions which are intended to be executed solely on the first processor wherein the software application is administered and managed including metering;

executing a partitioning program on the first processor, the partitioning program monitoring the execution of the software application on the first processor and intercepting instructions from portions of the software application which can be executed on the second processor wherein the partitioning program is administered and managed including limiting an ability to run applications; and executing a predefined generic program on the second processor, the predefined generic program communicating with the partitioning program so that a portion of the software application executing on the first processor is communicated to the second processor for execution wherein the predefined generic program is administered and managed including i)metering and ii) limited or secured client usage of particular applications;

wherein the software application, which is intended to be executed solely on the first processor, is at least partially executed on the second processor and an end user of the second processor is able to interact locally with the software application as if the entire software application were being executed on the second processor.

2. A method according to claim 1 wherein the partitioning program intercepts a plurality of media instruction which are intended to be executed on the first processor and transfers the media instructions to the second processor for execution.

3. The method of claim 2 wherein the media instructions are selected from a group comprising graphical instructions, audio instructions, or video instructions.

4. The method claim of 2 further comprising:

executing the predefined generic program on a third processor, the predefined generic program communicating with the portioning program, so that a portion of the software application executing on the first processor is communicated to the third processor for execution;

wherein the software application which intended to be executed solely on the first processor, is at least partially executed on the third processor and an end user of the third processor is able to interact locally with the software application as if the entire software application were being executed on the third processor.

5. The method of claim 4 wherein the second processor and the third processor access a common file, thereby enabling collaborative processing between the second processor and the third processor.

6. The method of claim 1 wherein the predefined generic program is executed in conjunction with web browsing software.

7. The method according to claim 6 wherein the first processor and the second processor communicate over the Internet.

8. The method according to claim 7 wherein the first processor is located in a server and the second processor is located in the client.

9. A method for executing a software application in a distributed computing system having at least a server and a client, the server and the client each executing operating system software, comprising the steps of:

executing the software application on the server, the software application having a plurality of portions which are intended to be executed solely on the server with the software application being administered and managed including metering;

executing a partitioning program on the server, the partitioning program monitoring the execution of the software application on the server and intercepting instructions from portions of the software application which can be executed on the client with the partitioning program being administered and managed including limiting an ability to run applications; and executing a predefined generic program on the client, the predefined generic program communicating with the partitioning program executing on the server and a web browsing program executing on the client, so that a portion of the software application executing on the server is communicated to client over the Internet for execution on the client with the predefined generic program being administered and managed including i) metering and ii) limited or secured client usage of particular applications;

wherein the software application, which is intended to be executed solely on the server, is at least partially executed on the client and an end user of the client is able to interact locally with the software application as if the entire software application were being executed on the client.

10. A method according to claim 9 wherein the partitioning program intercepts a plurality of media instruction which are intended to be executed on the server and transfers the media instructions to the client for execution.

11. The method of claim 10 wherein the media instructions are selected from a group comprising graphical instructions, audio instructions, or video instructions.

12. The method of claim 9 further comprising:

executing the predefined generic program on a second client, the predefined generic program communicating with the partitioning program so that a portion of the software application executing on the server is communicated to the second client for execution;

wherein the software application which is intended to be executed solely on the server, is at least partially executed on the second client and an end user of the second client is able to interact locally with the software application as if the entire software application were being executed on the second client.

13. The method of claim 12 wherein the first client and the second client access a common file, thereby enabling collaborative processing between the first client and the second client.

14. A distributed computing system, comprising:

a first processor, for executing operating system software, a software application having a plurality of portions which are intended to be executed solely on the first processor, and a partitioning program, the partitioning program monitoring the execution of the software application on the first processor and intercepting instructions from portions of the software application which can be executed on another processor with the software application being administered and managed including metering; and the partitioning program is administered and managed including limiting an ability to run applications; and a second processor executing operating system software and a predefined generic program, the predefined generic program communicating with the partitioning program so that a portion of the software application executing on the first processor is communicated to the second processor for execution with the predefined generic program being administered and managed including i) metering and ii) limited or secured client usage of particular applications;

wherein the software application, which is intended to be executed solely on the first processor, is at least partially executed on the second processor and an end user of the second processor is able to interact locally with the software application as if the entire application were being executed on the second processor.

15. A distributed computing system according to claim 14 wherein the partitioning program intercepts a plurality of media instructions, which are intended to be executed on the first processor, and transfers the media instructions to the second processor for execution.

16. A distributed computing system according to claim 15 wherein the media instructions are selected from a group consisting of graphical instructions, audio instructions, or video instructions.

17. A distributed computing system according to claim 14 further comprising:

a third processor, executing operating system software and the predefined generic program, and communicating with the partitioning program so that a portion of the software application executing on the first processor is communicated to the third processor for execution;

wherein the software application which is intended to be executed solely on the first processor, is at least partially executed on the third processor and an end user of the third processor is able to interact locally with the software application as if the entire software application were being executed on the third processor.

18. A distributed computing system according to claim 17 wherein the second processor and the third processor access a common file, thereby enabling collaborative processing between the second processor and the third processor.

19. A distributed computing system according to claim 14 wherein the predefined generic program is executed in conjunction with web browsing software.

20. A distributed computing system according to claim 19 wherein the first processor and the second processor communicate over the Internet.

21. A distributed computing system according to claim 20 wherein the first processor is located in a server and the second processor is located in a client.

22. A distributed computing system, comprising:

a server, for executing operating system software, a software application having a plurality of portions which are intended to be executed solely on the server, and a partitioning program, the partitioning program monitoring the execution of the software application on the server and intercepting instructions from portions of the software application which can be executed on a client with the software application being administered and managed including metering; and the partitioning program is administered and managed including limiting an ability to run applications; and a client executing operating system software and a predefined generic program, the predefined generic program communicating with the partitioning program so that a portion of the software application executing on the server is communicated to the client for execution with the predefined generic program being administered and managed including i) metering and ii) limited or secured client usage of particular applications;

wherein the software application, which is intended to be executed solely on the client, is at least partially executed on the client and the end user of the client is able to interact locally with the software application as if the entire software application were being executed on the client.

23. A distributed computing system according to claim 22 wherein the partitioning program intercepts a plurality of media instructions which are intended to be executed on the server and transfers the media instructions to the client for execution.

24. A distributed computing system according to claim 23 wherein the media instructions are selected from a group consisting of graphical instructions, audio instructions, or video instructions.

25. A distributed computing system according to claim 24 further comprising:

a second client, executing the predefined generic program and communicating with the partitioning program, so that a portion of the software application executing on the server is communicated to the second client for execution;

wherein the software application which is intended to be executed solely on the server, is at least partially executed on the second client and an end user of the second client is able to interact locally with the software application as if the entire software application were being executed on the second client.

26. A distributed computing system according to claim 25 wherein the first client and the second client access a common file, thereby enabling collaborative processing between the first client and the second client.

27. A distributed computing system according to claim 26 wherein the predefined generic program is executed in conjunction with web browsing software.

28. A distributed computing system according to claim 27 wherein the first processor and second processor communicate over the Internet.

29. The method of claim 1, wherein the software application being administered and managed includes at least one member selected from the group consisting of billing, selectably altering or disabling parameters of operating system components and loading a server application into an address space.

30. The method of claim 1, wherein the partitioning program being administered and managed includes at least one member selected from the group consisting of maintaining general consistency among file versions between server and client, limited or secured client usage of particular applications and disconnect recovery.

31. The method of claim 1, wherein the predefined generic program being administered and managed includes at least one member selected from the group consisting of maintaining general consistency among file versions between server and client, billing, limiting an ability to run applications, disconnect recovery, and selectable altering or disabling parameters of operating system components.

32. The method of claim 9, wherein the software application being administered and managed includes at least one member selected from the group consisting of billing, selectable altering or disabling parameters of operating system components and loading a server application into an address space.

33. The method of claim 9, wherein the partitioning program being administered and managed includes at least one member selected from the group consisting of maintaining general consistency among file versions between server and client, limited or secured client usage of particular applications and disconnect recovery.

34. The method of claim 9, wherein the predefined generic program being administered and managed includes at least one member selected from the group consisting of maintaining general consistency among file versions between server and client, billing, limiting an ability to run applications, disconnect recovery, and selectably altering or disabling parameters of operating system components.

35. The distributed computing system of claim 14, wherein the software application being administered and managed includes at least one member selected from the group consisting of billing, selectably altering or disabling parameters of operating system components and loading a server application into an address space.

36. The distributed computing system of claim 14, wherein the partitioning program being administered and managed includes at least one member selected from the group consisting of maintaining general consistency among file versions between server and client, limited or secured client usage of particular applications and disconnect recovery.

37. The distributed computing system of claim 14, wherein the predefined generic program being administered and managed includes at least one member selected from the group consisting of maintaining general consistency among file versions between server and client, billing, limiting an ability to run applications, disconnect recovery, and selectably altering or disabling parameters of operating system components.

38. The distributed computing system of claim 22, wherein the software application being administered and managed includes at least one member selected from the group consisting of billing, selectably altering or disabling parameters of operating system components and loading a server application into an address space.

39. The distributed computing system of claim 22, wherein the partitioning program being administered and managed includes at least one member selected from the group consisting of maintaining general consistency among file versions between server and client, limited or secured client usage of particular applications and disconnect recovery.

40. The distributed computing system of claim 22, wherein the predefined generic program being administered and managed includes at least one member selected from the group consisting of maintaining general consistency among file versions between server and client, billing, limiting an ability to run applications, disconnect recovery, and selectably altering or disabling parameters of operating system components.

\* \* \* \* \*

UNITED STATES PATENT AND TRADEMARK OFFICE
CERTIFICATE OF CORRECTION

PATENT NO. : 6,832,380 B1
DATED : December 14, 2004
INVENTOR(S) : Edwin J. Lau et al.

It is certified that error appears in the above-identified patent and that said Letters Patent is hereby corrected as shown below:

Column 12,
Line 60, replace "selectable" with -- selectably --.
Lines 64-65, replace "selectable" with -- selectably --.

Signed and Sealed this

Eighth Day of March, 2005

JON W. DUDAS
*Director of the United States Patent and Trademark Office*